3,507,841
TERPOLYMERS OF ETHYLENE, ACRYLONITRILE, AND AN UNSATURATED AMIDE
David W. McDonald, Texas City, Tex., assignor to Monsanto Company, St. Louis, Mo., a corporation of Delaware
No Drawing. Filed Aug. 12, 1965, Ser. No. 479,332
Int. Cl. C08f 15/40
U.S. Cl. 260—80.6           8 Claims

ABSTRACT OF THE DISCLOSURE

Substantially random addition terpolymers of ethylene, acrylonitrile, and an unsaturated amide prepared by polymerization at elevated temperatures and pressures in the presence of a free-radical-generating catalyst.

---

The present invention relates to new polymeric compositions and, more particularly, to interpolymers of ethylene with acrylonitrile and polymerizable unsubstituted and substituted acrylamides and methacrylamides and to a method for their preparation.

High-molecular-weight solid polymers of ethylene are well known in the art. These polymers have a wide range of physical characteristics and chemical properties which make them useful for many purposes. They can be produced by subjecting ethylene to polymerization at elevated pressures from 5,000 to 60,000 p.s.i.g. and elevated temperatures from 100° to 400° C. in the presence of free-radical initiators for the polymerization reaction. The properties of the polymers can be "tailored," so to speak, to a degree by varying polymerization conditions, using different initiators, etc. Variation in polymer properties such as density, molecular weight, melt index, tensile strength, stiffness and surface appearance can also be obtained by the use of compounds known as "modifiers" in the polymerization reaction and/or by polymerizing the ethylene with small amounts of comonomers. It has been proposed heretofore, for example, to polymerize ethylene in admixture with compounds containing one or more double bonds but the resulting products in many instances have been low-molecular-weight products unsuitable for the production of self-supporting films or shock-resistant molded objects such as bottles or the like because of their lack of the requisite toughness. In other instances, certain comonomers have resulted in improved toughness but adversely affected the stiffness of the polymer product.

It is, accordingly, an object of the present invention to provide novel, solid interpolymers of ethylene characterized by a high degree of toughness and yet possessing a stiffness either equivalent to or superior to that of polyethylene and prior art copolymers. Another object of the invention is to provide stiff, tough interpolymers of ethylene which are characterized by high transparency and are eminently suitable for use in the production of bottles, films and molded objects.

These and other objects and advantages of the invention which will become apparent from the following description thereof are obtained by interpolymerizing ethylene, acrylonitrile, and an amide of the formula

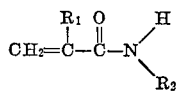

wherein $R_1$ may be hydrogen or a methyl group and $R_2$ may be hydrogen or an alkyl, hydroxyalkyl or aryl radical having up to 8 carbon atoms.

As examples of the amides which can be interpolymerized with ethylene and acrylonitrile to produce the novel and improved interpolymers of the invention, there may be mentioned acrylamide, N-methylacrylamide, N-ethylacrylamide, N-propylacrylamide, N-isopropylacrylamide, N-tert-butyl acrylamide, N-amylacrylamide, N-tert-octylacrylamide, N - decylacrylamide, N - hydroxymethylacrylamide, N-hydroxyethylacrylamide, N-hydropropylacrylamide, N-phenylacrylamide, N - o-tolylacrylamide, N-p-tolylacrylamide, N-naphthylacrylamide, and the like as well as methacrylamide and all of the corresponding substituted methacrylamides.

In general, the interpolymers of the invention should contain at least 50 mole percent ethylene. Usually, amounts of ethylene from about 70 to about 98.8 mole percent are employed with amounts from about 85 to about 98 percent being preferred. Acrylonitrile is present in amounts from about 1 to about 10 mol percent and preferably constitutes from 1 to about 5 mole percent of the interpolymer. The amount of the unsaturated amide which constitutes the third component of the novel interpolymers of the invention may vary from about 0.2 to about 20 mole percent but preferably the quantity of the amide in the interpolymer is from about 1 to about 10 mole percent.

The polymerization process by which the interpolymers are produced is conducted at superatmospheric pressures from about 5,000 p.s.i.g. up to as high as 60,000 p.s.i.g. Preferably, the pressures employed are in the range from about 20,000 to about 35,000 p.s.i.g.

While the temperature of the polymerization process may be varied over the range from about 100° to about 400° C., preferred temperatures are those from about 130° to about 300° C.

Any of the well known free-radical initiators used for catalyzing the polymerization of ethylene can be employed for producing the novel interpolymers herein described. Among these may be mentioned molecular oxygen; per-oxygen type compounds such as hydrogen peroxide, dialkyl dioxides such as diethyl peroxide and di-tert-butyl peroxide, diacyl peroxides such as lauroyl peroxide and benzoyl peroxide, alkyl hydroperoxides such as tert-butyl hydroperoxide, diperoxy dicarbonate esters such as diisopropylperoxy dicarbonate, tert-alkyl percarboxylates such as tert-butylperbenzoate, persulfates such as potassium persulfate, peracids such as peracetic acid and the like; azo-type compounds such as azo-bis (isobutyronitrile); azines such as benzalazine; oximes such as acetone oxime; etc. Particularly suitable are peroxides such as di-tert-butyl peroxide, for example. Only small amounts of the initiator are required. Generally, initiator concentration will vary from about 0.005% to about 2% of the total weight of the monomers charged to the polymerization reactor.

So-called polymerization "modifiers" or chain-transfer agents can also be employed in the manufacture of the interpolymers of the invention, if desired, to obtain certain polymer properties which such modifiers or chain-transfer agents may impart. Examples of compounds in general used in the art for this purpose are aliphatic alcohols containing one to ten carbon atoms and preferably three to five carbon atoms such as methanol, propanol, isobutanol, hexanol and decanol; aliphatic saturated ketones containing three to ten carbon atoms and preferably three to five carbon atoms such as acetone, diethyl ketone, methyl isopropyl ketone and the like; saturated aliphatic aldehydes containing one to eight carbon atoms and preferably two to five carbon atoms such as formaldehyde, acetaldehyde, butyraldehyde and the like; saturated hydrocarbons such as ethane, propane, cyclohexane and the like; aromatic hydrocarbons such as toluene, xylene and the like; chlorinated hydrocarbons such as chloroform, carbon tetrachloride and the like; and hydrogen.

The polymerization process may be either a batch or a continuous one. The preferred method is the continuous type of operation wherein ethylene, acrylonitrile, the amide comonomer, initiator, and modifier, if one is used, are charged to a reactor maintained under suitable conditions of temperature and pressure, interpolymer is continuously separated from the reactor effluent, and unreacted monomers, initiator, and modifier, if any, are recycled to the reactor.

The invention is illustrated in the following example which, however, is not to be construed as limiting it in any manner whatsoever. All percentages given therein are on a molar basis unless otherwise indicated, except conversion which is given in weight percent.

EXAMPLE

A series of experiments were conducted in which ethylene was interpolymerized with acrylonitrile and acrylamide or an N-substituted acrylamide. In each experiment, a steel reaction bomb together with all accessory lines thereto was carefully cleaned and flushed with ethylene to eliminate all traces of air or oxygen. The normally gaseous feed materials, i.e., ethylene and propane which was used as a modifier, were introduced into the reaction chamber of the bomb heated to the reaction temperaure of 130° C. at atmospheric pressure until the pressure increased to about 700 p.s.i. Thereafter, additional hot ethylene was pumped into the bomb until the pressure reached about 7500 p.s.i. at the temperature level of 130° C. Then, the mechanical agitator inside the bomb was activated and the normally liquid feeds, i.e., the comonomer solutions and a benzene solution of di-tert-butyl peroxide initiator equal to $2.24 \times 10^{-3}$ mole of peroxide per liter of reactor volume were forced from a small cold compartment of the bomb where they had been stored free of air or oxygen contamination into the reaction chamber by means of high pressure ethylene charged until a final pressure of 20,000 p.s.i. at 130° C. was attained. After the desired reaction time, the bomb was depressurized and the polymer product was recovered and its physical properties determined.

A summary of reaction conditions for the various runs made is presented in Table I below and the physical properties determined for the interpolymers produced under these conditions are presented in Table II. The methods used for the determination of melt index and density are described in J. App. Polymer Sci., 8, 839 (1964) and J. Polymer Sci., A–2, 1301 (1964), respectively. All other evaluations were performed on nominally 20-mil thick specimens. A standard procedure, ASTM D–1822–61T, was followed for the tensile impact test using the "S" specimen. The "L" specimen of this procedure was used for slow speed testing. It was pulled at 2 in./min. in an Instron tensile testing machine until the sample failed. From the force curve, the modulus (5% secant), tensile at yield, and tensile at fail were calculated based on the dimensions of the unextended specimen. Haze was also determined on 20-mil specimens using Procedure A of ASTM D–1003–61 defining haze as "diffuse luminous transmittance" where a lower value indicates a less hazy, more transparent sample.

In all runs, total nitrogen content of the polymer was detedmined by combustion analysis. In Runs 2–6, the acrylonitrile used was tagged with $C^{14}$ and the combined acrylonitrile determined by scintillation counting. The amide content was calculated by difference.

From the data presented, it will be seen that impact resistance, toughness, transparency and, at higher amide concentrations, also stiffness of the interpolymers obtained by the addition of the unsaturated amides to the conventional ethylene-acrylonitrile copolymerization system were significantly improved.

TABLE I

| Run No. | Feed composition | | | | | | | Reaction time (min.) | Conversion, wt. percent |
|---|---|---|---|---|---|---|---|---|---|
| | Ethylene, percent | AN,[1] percent | Amide | percent | $CH_3OH$, percent | $C_3H_8$, percent | Benzene, percent | | |
| 1 | 85.4 | 0.1 | None | | 0.0 | 14.4 | 0.1 | 56 | 10.1 |
| 2 | 84.2 | 0.1 | Acrylamide | 0.2 | 0.9 | 14.4 | 0.2 | 89 | 6.6 |
| 3 | 84.7 | 0.1 | N-Hydroxy-methylacryl-amide | 0.1 | ([2]) | 14.4 | 0.1 | 85 | 4.3 |
| 4 | 84.6 | 0.1 | N-Isopropyl-acrylamide | 0.2 | 0.6 | 14.4 | 0.1 | 75 | 8.6 |
| 5 | 81.8 | 0.1 | N-tert-butyl-acrylamide | 0.6 | 7.0 | 10.4 | 0.1 | 200 | 8.0 |
| 6 | 82.3 | 0.1 | N-phenyl-acrylamide | 0.2 | 2.9 | 14.4 | 0.1 | 102 | 2.3 |

[1] Acrylonitrile.  [2] 0.5% $H_2O$ used.

TABLE II

| Run No. | Polymer composition (percent) | | | Melt index (dg./min.) | Density (g./cc.) | Modulus (p.s.i.) | Tensile yield (p.s.i.) | Tensile fail (p.s.i.) | Tensile impact (p.s.i.) | Haze (percent) |
|---|---|---|---|---|---|---|---|---|---|---|
| | $C_2H_4$ | AN[1] | Amide | | | | | | | |
| 1 | 98.6 | 1.4 | 0.0 | 0.7 | 9.34 | 1,869 | 1,990 | 3,210 | 62 | 69 |
| 2 | 97.7 | 1.6 | 0.7 | 3.5 | 9.35 | 1,520 | 1,730 | 3,240 | 107 | 57 |
| 3 | 97.7 | 2.0 | 0.3 | 4.8 | 9.36 | 1,200 | 1,510 | 2,250 | 81 | 63 |
| 4 | 96.7 | 1.3 | 2.0 | 4.9 | 9.32 | [2] 1,630 | 1,560 | 3,820 | 205 | 7 |
| 5 | 93.9 | 1.1 | 5.0 | 7.8 | 9.32 | [2] 2,590 | 1,900 | 4,790 | 296 | 9 |
| 6 | 92.4 | 3.4 | 4.2 | 13.8 | 9.75 | 1,880 | 2,060 | 3,280 | ([3]) | 12 |

[1] Acrylonitrile.
[2] Where the modulus is greater than the tensile at yield, it was necessary to extrapolate the initial portion of the stress-strain curve to 5% elongation.
[3] Not measured.

The interpolymers of the invention are useful per se in many applications or they may also be blended with other thermoplastic polymers to produce films, moldings, bottles and the like. Fillers, reinforcing agents such as fibrous materials and foaming agents may be added to the interpolymers to render them suitable for particular applications. The properties of the interpolymers can be preserved or enhanced by the addition of stabilizing agents and pigments may be added to the interpolymers to obtain colored compositions.

What is claimed is:

1. Substantially random addition interpolymers consisting essentially of from about 70 to about 98.8 mole percent ethylene, from about 1 to about 10 mole percent of acrylonitrile, and from about 0.2 to about 20 mole percent of an amide of the formula

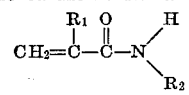

wherein $R_1$ is hydrogen and $R_2$ is selected from the group consisting of isopropyl and tert-butyl radicals.

2. Substantially random addition interpolymers consisting essentially of from about 85 to about 98 mole percent ethylene, from about 1 to about 5 mole percent acrylonitrile, and from about 1 to about 10 mole percent of an amide of the formula

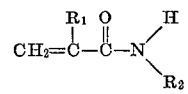

wherein $R_1$ is hydrogen and $R_2$ is selected from the group consisting of isopropyl and tert-butyl radicals.

3. The interpolymers of claim 2 wherein said amide is N-isopropylacrylamide.

4. The interpolymers of claim 2 wherein said amide is N-tert-butyl acrylamide.

5. The process of producing substantially random addition interpolymers which comprises polymerizing ethylene with acrylonitrile and an amide of the formula

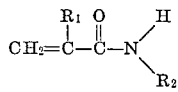

wherein $R_1$ is hydrogen and $R_2$ is selected from the group consisting of isopropyl and tert-butyl radicals at a pressure from about 5,000 p.s.i.g. to about 60,000 p.s.i.g. and a temperature from about 100° to about 400° C. in the presence of a sufficient amount of a free-radical-generating compound to initiate said polymerization.

6. The process of producing substantially random addition interpolymers which comprises polymerizing ethylene with acrylonitrile and an amide of the formula

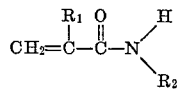

wherein $R_1$ is hydrogen and $R_2$ is selected from the group consisting of isopropyl and tert-butyl radicals at a pressure from about 20,000 p.s.i.g. to about 35,000 p.s.i.g. and a temperature from about 130° to about 300° C. in the presence of a sufficient amount of a dialkyl dioxide to initiate said polymerization.

7. The process of claim 6 wherein said amide is N-isopropylacrylamide and said dialkyl dioxide is di-tert-butyl peroxide.

8. The process of claim 6 wherein said amide is N-tert-butyl acrylamide and said dialkyl dioxide is di-tert-butyl peroxide.

References Cited

UNITED STATES PATENTS

| 3,366,605 | 1/1968 | Seiner | 260—72 |
| 3,264,275 | 8/1966 | Pattison | 260—80.6 |
| 2,650,913 | 9/1953 | Boyd | 260—94.9 |
| 2,396,785 | 3/1946 | Hanford | 260—78 |

JOSEPH L. SCHOFER, Primary Examiner

R. S. BENJAMIN, Assistant Examiner

U.S. Cl. X.R.

260—80.73